March 6, 1951 R. J. IFIELD ET AL 2,544,427
MEANS FOR CONTROLLING THE TEMPERATURE OF HOT GASES
Filed Oct. 15, 1948

Inventors
R. J. Ifield
O. N. Lawrence
By Glaser & Downing Kubla
Attys.

UNITED STATES PATENT OFFICE 2,544,427

MEANS FOR CONTROLLING THE TEMPERATURE OF HOT GASES

Richard Joseph Ifield, Dural, New South Wales, Australia, and Owen Napier Lawrence, Dorridge, England, assignors to Joseph Lucas Limited, Birmingham, England Application October 15, 1948, Serial No. 54,755
In Great Britain October 16, 1947

3 Claims. (Cl. 236—79)

This invention has for its object to provide improved means for controlling the temperature of hot gases, and particularly of the hot gases produced in the combustion chambers of internal combustion turbines, jet-propulsion prime movers, furnaces and the like.

The invention is based on the fact that when gas flows through an orifice under so-called critical pressure conditions, the mass rate of flow is approximately proportional to the absolute pressure at the entrance of the orifice, and inversely proportional to the square root of the absolute temperature of the gas at the entrance side of the orifice. If two orifices are arranged in series, the mass flow is the same through both, then $T_1 = KT_2P_1^2/P_2^2$, where $T_1T_2$ and $P_1P_2$ are respectively the absolute temperatures and pressures at the entrances of the two orifices, K being a constant.

From the above relationship it follows that if $T_2$ is kept constant, $T_1$ can be controlled by a device which is dependent for its action on appropriate variation of $P_1/P_2$.

Figure 1:
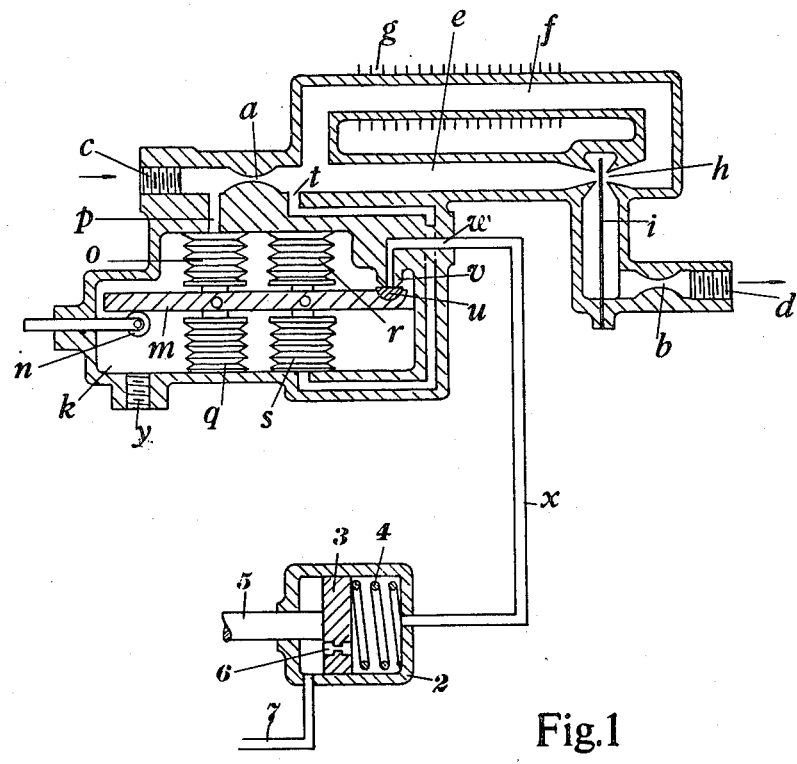
Figure 1 is a sectional view illustrating diagrammatically one embodiment of the invention for controlling the temperature in the combustion chamber of a jet-propulsion prime mover, or an internal combustion turbine, the control being effected by variation of the rate of supply of liquid fuel to the said chamber.

Referring to the drawings, we employ an apparatus which is provided with a pair of small Venturi nozzles or orifices $a$, $b$ of fixed area. The orifices are arranged in series, and the first orifice $a$ is provided with a pipe connection $c$ through which a small quantity of hot gas can be supplied to it from the combustion chamber. The second orifice $b$ is open to the atmosphere or is provided with a connection $d$ for a pipe leading to any other convenient discharge position. Between the two orifices are arranged a pair of passages $e$, $f$ connected in parallel with each other, the passage $f$ being adapted to be cooled by any convenient means (illustrated diagrammatically by the fins $g$). At the meeting position of the two streams flowing through these passages is arranged a mixing valve $h$ under the control of a bi-metal strip $i$ or other temperature-responsive means, the mixed gases in the region of the entrance to the orifice $b$ being kept at a substantially constant temperature by variation under the control of the valve of the relative proportions of the hot and cooled gas streams flowing through $e$ and $f$.

Adjacent to the first orifice is arranged a chamber $k$ in which is mounted a lever $m$. At one end the lever is supported by a fulcrum $n$ which is slidably adjustable along the lever under manual control for varying the working conditions of the apparatus. At each side of the lever are mounted a pair of elastic capsules, the capsules at one side being disposed immediately opposite those at the other side. The capsule $o$ at one side is in communication through a passage $p$ with the entrance side of the first orifice $a$, and the opposite capsule $q$ is evacuated. The capsule $r$ alongside the first mentioned capsule is evacuated, and the capsule $s$ opposite to it is in communication with the exit side of the orifice $a$ by way of a passage $t$. The end of the lever $m$ remote from the fulcrum carries a closure member $u$ which co-operates with a seating $v$ in the chamber, the seating being in communication with a passage $w$ through which (and a pipe $x$) can flow the fluid employed for actuating any appropriate servomechanism. Fluid entering the chamber is discharged through an outlet $y$.

Figure 2:
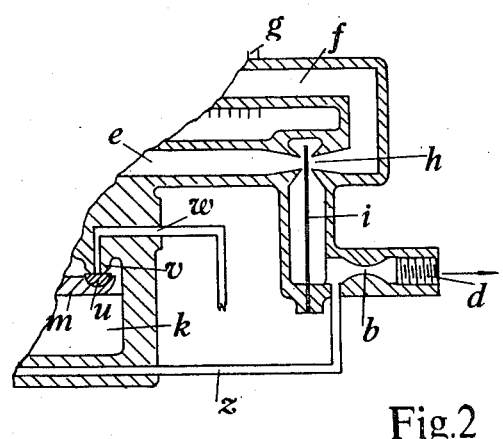
Figure 2 illustrates a modification of the arrangement shown in Figure 1.

For the purpose of the invention it is required that the capsule $o$ shall be responsive to the gas pressure at the entrance of the orifice $a$, and that the capsule $s$ shall be responsive to the gas pressure at the entrance to the second orifice $b$. But as the pressure at the exit side of the orifice $a$ is substantially equal to the pressure at the entrance to the orifice $b$ it is convenient to connect the capsule $s$ to the exit side of the orifice $a$ by a passage as $t$, as shown in Figure 1. But where this condition of equality of pressure is not adequately satisfied, or where for constructional reasons it is more convenient to connect the capsule $s$ to the entrance of the orifice $b$ the modified arrangement shown in Figure 2 is employed, the capsule $s$ being then connected by (for example) a pipe $z$ to the entrance of the orifice $b$.

The particular form of fluid operated servomechanism shown (as an example) in Figure 1, comprises a closed cylinder 2 in which can slide a piston 3, the latter being loaded by a spring 4. From one side of the piston extends a rod 5 for transmitting the movements of the piston to the device to be actuated. In the piston is provided a restricted orifice 6, and pressure fluid is admitted to one end of the cylinder by a pipe 7. The other end of the cylinder communicates with the valve seating $v$ by way of the pipe $x$ above mentioned. Alternatively the restricted orifice 6 may be provided in a by-pass interconnecting the two ends of the cylinder.

With the closure member $u$ closed on its seating $v$, the fluid pressure acting on both sides of the piston 3 is balanced and the piston can then be moved to the left by the spring 4. But when the closure member $v$ is moved off its seating in consequence of an increase of pressure in the capsule $o$ (relatively to that in the capsule $s$), fluid can flow from the right hand end of the cylinder and under the preponderance of fluid pressure then acting on the left hand side of the piston the latter moves in opposition to the spring.

When the control of the temperature in the combustion chamber is effected by variation of the amount of liquid fuel supplied by a variable delivery pump, we utilise the movements of the piston 3 to vary the pump output. Alternatively the amount of fluid supplied to the combustion chamber may be varied by a by-pass device under the control of a fluid operated mechanism, or a throttle valve in the fuel supply line in which case the piston 3 serves to actuate such mechanism or valve.

From the foregoing description it will be seen that the lever $m$ moves in the direction for closing or opening the seating $v$ in response to variation of the difference of pressure at the entrance side of the first and second orifices, and increase of the temperature in the combustion chamber beyond a predetermined amount is accompanied by such a variation of the said pressures as will cause the supply of fuel to the combustion chamber to be appropriately reduced. The adjustment of the apparatus to suit different maximum temperatures is effected by appropriate movement of the lever fulcrum $n$.

The invention is not, however restricted to the example above described. Thus, instead of controlling the temperature of the gases in the combustion chamber by varying the fuel supply, the same result may be obtained by controlling an inflow of air to the hot gases. Moreover, the invention is not restricted to the particular purpose above specified, as it may be applied to other analogous purposes wherein the temperature of a hot gas is required to be kept substantially constant at a selected value.

Having thus described our invention what we claim as new and desire to secure by Letters Patent is:

1. In means for controlling the temperature of hot gases, an orifice of fixed area, a second orifice of fixed area arranged in series with the first orifice, a pair of passages connected in parallel between the two orifices, cooling means associated with one of said passages, a mixing valve at the junction of said passages adjacent to said second orifice, a device responsive to gas temperature for regulating said valve, a member responsive to variations of the difference between the pressures at the entrances of the two orifices, and a fluid-operated mechanism responsive to movement of said member.

2. In means for controlling the temperature of hot gases, a pair of orifices of fixed area arranged in series, a gas cooling means between said orifices, a valve lever, capsules situated at opposite sides of and acting on said valve lever, passages connecting said capsules to said orifices so that said valve lever is responsive to variations of the difference between the pressures at the entrances of the two orifices, and a fluid-operated mechanism responsive to movement of said valve lever.

3. Means as claimed in claim 2, in which the valve lever is provided with a slidably adjustable fulcrum.

RICHARD JOSEPH IFIELD.
OWEN NAPIER LAWRENCE.

REFERENCES CITED

The following references are of record in the file of this patent:

UNITED STATES PATENTS

| Number | Name | Date |
| --- | --- | --- |
| Re. 11,413 | Uehling et al. | Apr. 17, 1894 |
| 1,630,318 | Tate | May 31, 1927 |
| 1,987,200 | Mabey | Jan. 8, 1935 |